Sept. 15, 1964    J. W. RENTSCHLER    3,148,931
ANTI-THEFT MEANS FOR FUEL DELIVERY TRUCK
Original Filed Aug. 12, 1960    4 Sheets-Sheet 1

INVENTOR
JOHN WALTER RENTSCHLER
BY *Beale & Jones*
ATTORNEYS

Sept. 15, 1964  J. W. RENTSCHLER  3,148,931
ANTI-THEFT MEANS FOR FUEL DELIVERY TRUCK
Original Filed Aug. 12, 1960  4 Sheets-Sheet 2
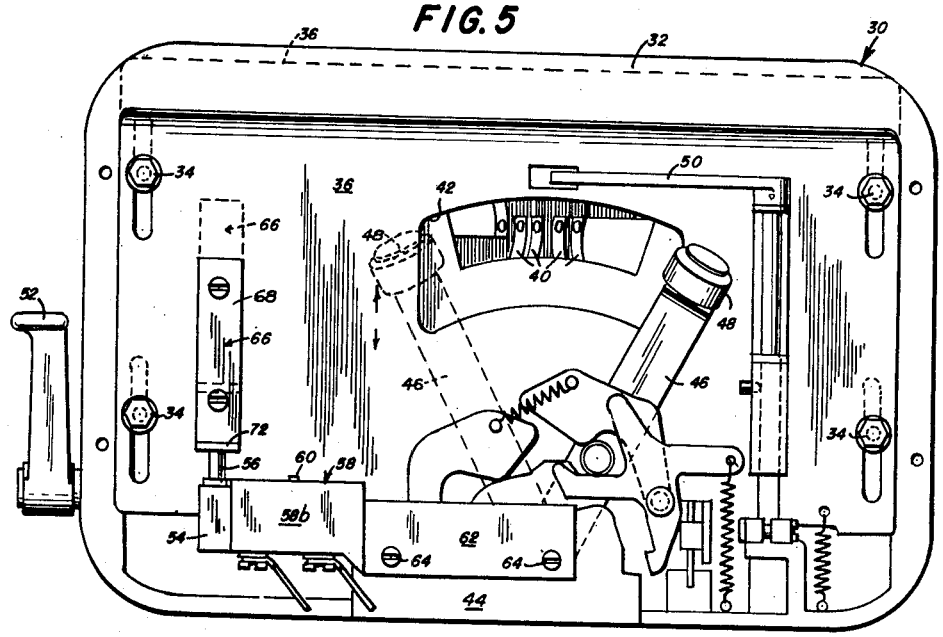
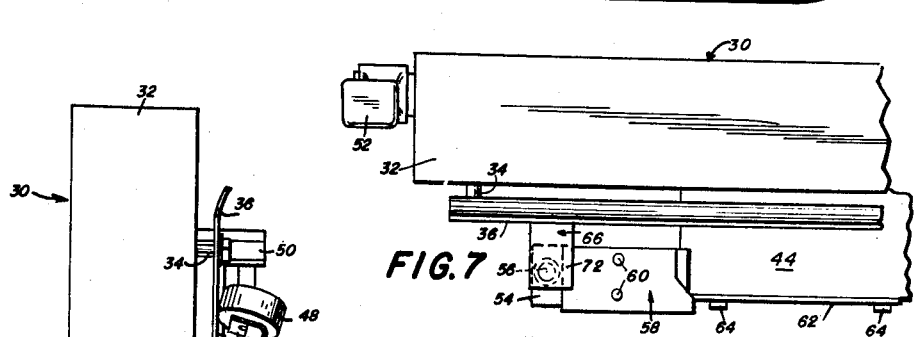
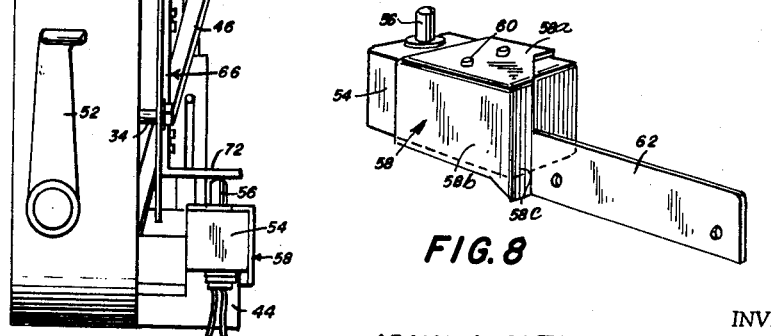
INVENTOR
JOHN WALTER RENTSCHLER
BY *Beale and Jones*
ATTORNEYS

INVENTOR
JOHN WALTER RENTSCHLER

BY Beale and Jones

ATTORNEYS

Sept. 15, 1964     J. W. RENTSCHLER     3,148,931
ANTI-THEFT MEANS FOR FUEL DELIVERY TRUCK
Original Filed Aug. 12, 1960     4 Sheets-Sheet 4
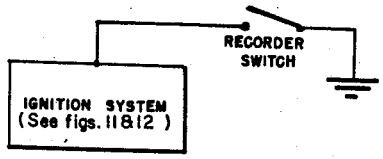
FIG.15     FIG.16
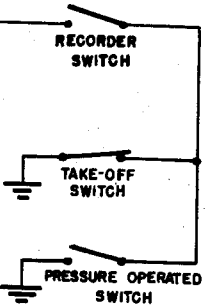
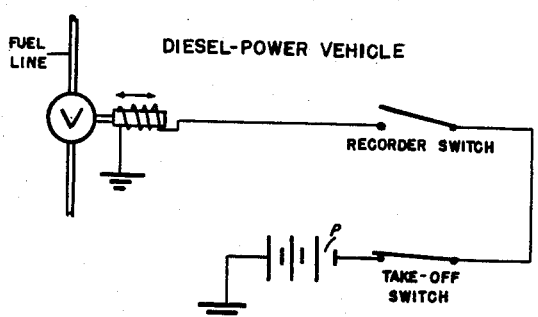
FIG.17
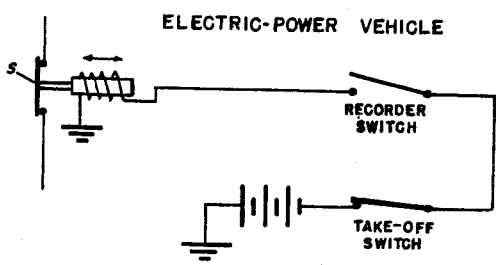
FIG.18
INVENTOR
JOHN WALTER RENTSCHLER
BY *Beale and Jones*
ATTORNEYS.

United States Patent Office 3,148,931
Patented Sept. 15, 1964

3,148,931
ANTI-THEFT MEANS FOR FUEL
DELIVERY TRUCK
John Walter Rentschler, 6221 Monmouth Ave.,
Ventnor, N.J.
Original application Aug. 12, 1960, Ser. No. 49,214, now Patent No. 3,092,289, dated June 4, 1963. Divided and this application Sept. 6, 1962, Ser. No. 227,101
1 Claim. (Cl. 346—14)

This invention relates to an anti-theft means for a fuel delivery truck. More specifically, this invention relates to means whereby a dishonest fuel delivery truck attendant is precluded from making a "short" delivery. By "short" delivery is meant a partial delivery to one customer, a second delivery to a favored customer and a billing of the first customer for both deliveries. This is a divisional application of my copending parent application Serial No. 49,214, filed August 12, 1960, now U.S. Patent 3,092,289, issued June 4, 1963.

It is presently the practice in the delivery of fuel from a vehicle to use a sales slip impressed by a recorder associated with the meter of the vehicle. A typical recorder is disclosed in the U.S. Patent 2,204,922 which issued June 18, 1950, to W. F. Berck. Under this practice, the recorder is actuated twice for each delivery. It is first actuated to record on the sales slip the reading of the meter at the commencement of the delivery. Later, it is actuated after delivery to impress on the same sales slip the reading of the meter at that time. Means are provided to prevent removal of the sales slip between impressions. It can be seen that the amount of the delivery is the difference in the two readings. The sales slip is left with the customer and a duplicate copy is taken back to the fuel oil delivery office for billing purposes.

It has been possible with arrangements in the past for a dishonest delivery man to actuate the recorder at the beginning of the delivery, make a partial delivery to a first customer, and then to drive to a favored customer, dispense a second delivery, and then actuate the recorder for a second time. The sales slip would then be returned to the first customer who is then billed for both deliveries.

Under the present invention, the dishonest attendant is precluded from such practice. Any attempt he may make will be thwarted by his inability to drive the vehicle until the recorder is actuated for the second time. My invention includes means associated with the meter disabling the vehicle-propulsion means during the time between the recordings of the meter.

It is therefore an object of this invention to provide means disabling for propulsion purposes the engine of a fluid delivery truck until the end-of-delivery recording has been made on the sales slip.

It is a further object of the invention to provide for a fuel delivery truck anti-theft means of foolproof and reliable nature.

It is a further object of this invention to provide for a fuel delivery truck anti-theft means which may be readily sealed against tampering.

It is a further object of the invention to provide for a fuel delivery truck anti-theft means which may be easily checked to see if it is functioning properly.

It is a further object of this invention to provide for a fuel delivery truck anti-theft means which may be incorporated into existing equipment by an inexpensive simple modification.

This invention embodies other novel features, details of construction and arrangement of parts which are hereinafter set forth in the specification and claim, and illustrated in the accompanying drawings, wherein:

FIG. 1 is a perspective view showing in broken outline a delivery truck and showing schematically in solid lines placement of the various components embodying the invention;

FIGS. 2 through 4 inclusive are schematic diagrams of a circuit in various conditions, said circuit embodying the invention;

FIG. 5 is a rear elevational view of a meter recorder embodying the invention and having the rear portion of its housing removed;

FIG. 6 is a side elevational view of a meter recorder embodying the invention and having the rear portion of its housing removed;

FIG. 7 is a fragmentary top plan view of a meter recorder embodying the invention and having the rear portion of its housing removed;

FIG. 8 is a perspective view of a switch and switch bracket as used in a meter recorder embodying the invention;

FIGS. 15 through 18 are schematic diagrams of electrical circuits embodying modified forms of the invention.

Briefly, the invention comprises in combination a fluid dispensing vehicle having propulsion motor means, meter recording means adapted to be provided with a sales slip to be impressed by said recording means before and after the dispensation of fluid from the vehicle, and means associated with the meter recording device to deactivate said propulsion motor means when an attempt is made to drive said vehicle during the period between the before- and after-delivery recordings.

Figure 1:
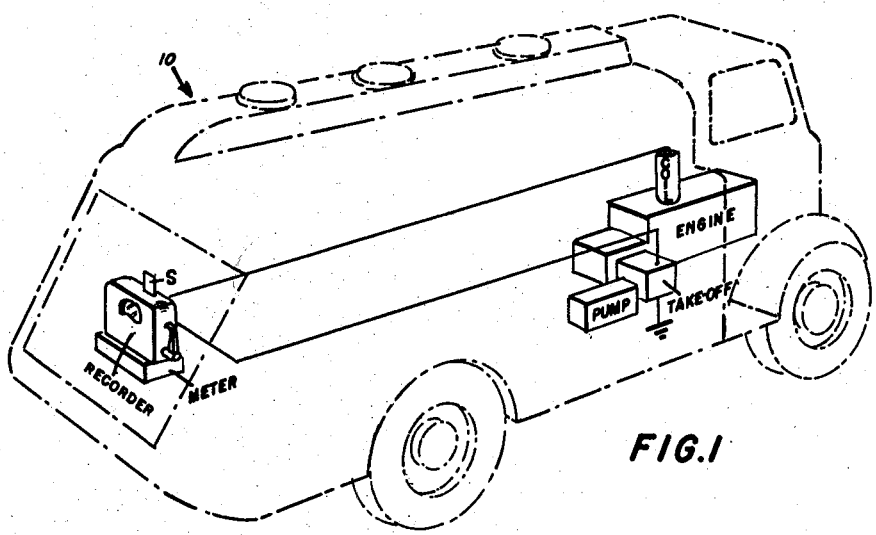

Referring more specifically to the drawings, a fuel delivery truck embodying the invention is designated 10 in FIG. 1. Mounted in the truck is the engine or motor propulsion means having its ignition coil, the fuel delivery pump, and take-off means connected between the engine and the pump. Also mounted on the vehicle is a meter recorder driven by a meter through which the dispensed fluid travels. The recorder is adapted to receive a sales slip S. The mounting of the engine, pump, take-off, and meter recorder are well known in the art.

The meter recorder is shown in FIGS. 5, 6, and 7, and is designated 30. It may comprise a stationary frame 32 mounted in a vertical position and having a plurality of rearwardly directed studs 34. A sales slip supporting tray 36 is provided with a plurality of slots receiving the studs 34 respectively whereby the tray is adapted to reciprocate vertically with respect to the frame 32. Mounted in the frame by means well known in the art are type segments 40 operatively connected to the meter. These segments are exposed through a window 42 in the tray. A block 44 extends rearward at the lower end of the frame 32 and provides a pivoted mounting for one end of a movable arm 46. The upper end of the arm is provided with a roller platen 48. The arm is adapted to oscillate so that the roller platen rolls over the faces of the type segments 40. It will be noted that the tray carries a punch lever 50 having a sharp end adapted to extend through a slot in the tray to retain the sales slip. The tray 36, the moving platen 48, and the punch lever 50 are all driven by a crank 52 disposed for operation on the outside of the housing.

In use, prior to delivery the salesslip is inserted in the recorder between the tray 36 and the frame 32. The tray at this time is in the elevated position shown in broken lines in FIG. 5 and the moving platen 48 in the leftward position also shown in broken lines. The attendant then turns the crank 52 through its first cycle. The punch lever 50 driven by the crank pierces the sales slip, holding it from removal. The moving platen 48 swings over the type segments 40, impressing the before-delivery reading on the slip, and assumes the position shown in full lines. The tray 36 then lowers to the position shown in full lines, carrying the slip down with it.

After the dispensation of fluid, the attendant turns the crank 52 in a reverse direction. The moving platen 48 swings to the leftward position shown in dotted lines passing over the type segments 40 disposed in their new reading and recording the reading on the slip. The tray 36 moves to the original elevated position, and the punch lever 50 releases the sales slip for removal from the recorder.

In the preferred embodiment of the invention a switch 54 is mounted rigidly against the frame 32 of the recorder. The switch best suited for this purpose has been found to be of the micro-switch type having a plunger actuator 56 of short travel and being structurally designed so that an electric circuit connected thereto is normally held open by spring means within the switch housing. The circuit may be closed by depression of the plunger against the force of the spring.

As shown in FIG. 5, the switch is mounted against the frame 32 in such a position that the plunger 56 is directed upwardly and that the housing of the switch is spaced outward from the recorder so that it does not interfere with the movement of the tray 36. It has been found that the mounting of the switch in a rigid and proper placement is extremely important. As is best shown in FIG. 8, the mounting means for the micro-switch comprises a bracket 58 having a sturdy sheet metal housing featuring three intersecting planar walls 58a, 58b, 58c. The presence of these three intersecting walls has been found effective because it creates a box-like structure of substantial strength. The upper horizontal wall 58a of this structure is firmly fixed in position and it is to this wall that the switch 54 is secured. It is important that this top wall 58a be firmly fixed because the pressure in actuating the switch is in a downward direction and were the wall not fixed such pressure would bend the wall and work the switch out of position. The top wall 58a of the switch bracket is formed preferably with a pair of tapped apertures which threadedly receive mounting bolts 60 extending up through the switch from underneath. These bolts urge the top wall of switch 54 firmly against the underside of the top wall 58a of the bracket. If it is desired to lower slightly the vertical position of the switch, shims may be disposed between the top wall 58a of the bracket and the switch 54.

Extending perpendicular from the partial vertical wall 58c of the bracket and disposed in a plane parallel to the movement of the switch plunger is a flat elongate mounting arm 62. The arm is of considerable width and is provided with a pair of spaced apertures through which extend mounting bolts 64 which engage in tapped holes in the rear face of the block 44 to hold the bracket 58 securely.

To effect movement of the switch plunger 56, upon the movement of the sales slip tray, there is provided an L-shaped co-acting means 66. This means comprises a flat elongate vertical leg 68 which is secured by a pair of short mounting bolts 70 against the sales slip tray in an area above the switch plunger 56. Directed perpendicular from the lower end of this vertical leg is a shorter horizontally disposed arm 72 (see FIG. 6). The co-acting means is fashioned from sturdy strip material which is not likely to flex or bend.

Reviewing the operation of the recorder once more, with the switch and its co-acting means in mind, it will be noted that after the before-delivery printing the tray 36 lowers the position shown in solid lines in FIG. 5. In doing so, it advances arm 72 down to engage and depress the switch plunger 56. Such depression of the plunger closes the electric circuit in which the switch is associated. The circuit will, of course, remain closed until the arm 72 raises from the plunger as the tray returns to its initial elevated position after the end-of-delivery printing.

It will be understood that the switch 54 and arm 72 must be positioned relatively so that the switch cannot be released to return to its electrically open disposition *until the end-of-delivery printing is made.* This is one reason why the positioning of the switch is critical.

*Circuit and General Operation*

Figure 2:
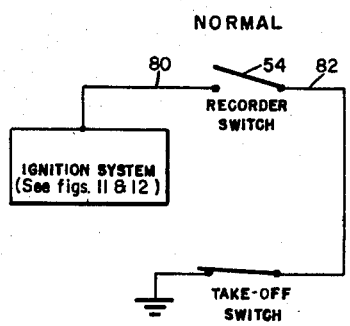
Figure 3:
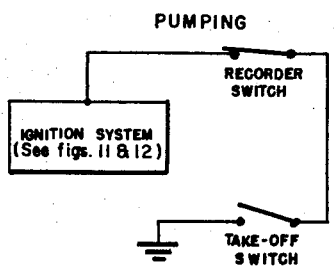

In the preferred embodiment as diagrammed in FIGURE 2, the recorder switch, above described, is in series electrically with a pump take-off switch. The pump take-off switch is mounted adjacent the pump power take-off and is arranged to be electrically open when the take-off is engaged as will be explained. These two switches are electrically in series circuit between the ignition system and the metal frame of the vehicle so that when the recorder switch is electrically closed (see FIG. 4) and the take-off switch is electrically closed, the ignition system is grounded, shorting out the spark plugs and making the engine inoperative. FIGURE 3 discloses the disposition of the two switches during the dispensing wherein the recorder switch is closed and the pump take-off switch is electrically open because the take-off is engaged. Because one of these two switches is open, the engine will continue to operate.

Figure 4:
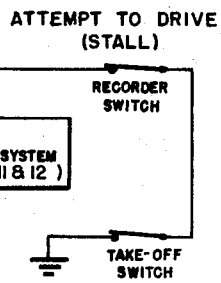

With respect to the arrangement shown in FIGURES 2, 3 and 4, for example, the operator has parked his oil delivery truck and is ready to make a delivery. The power take-off is engaged and switch lever 136, see FIG. 13, pivots the take-off switch housed within box 132 to electrically open position. A sales slip is inserted into the tray 36, see FIG. 5, of the recorder, the tray 36 being in the up position as indicated by broken line in FIG. 5. The attendant then turns the crank 52 through its first cycle. The punch lever 50 driven by the crank pierces the sales slip; holding it from removal. The moving platen 48 swings from the broken line position over the type segments 40 impressing the before-delivery reading on the slip. The tray 36 carrying the sales slip has now lowered to the position shown in full lines and arm 72 has moved down with the tray to push the actuator 56 of the recorder switch 58 down to electrically closed position as shown in FIGS. 3 and 4. If a partial delivery is made and sales slip is left in the recorder with the tray in the down position and unmoved and it is desired to move the truck, the power take-off must be disengaged. If the power take-off is disengaged, the arm 136 will swing and rotate the power take-off switch in the box 132, see FIG. 13, and that switch will close. This will complete a circuit from the ground lead terminal of the ignition coil of the ignition system as shown in FIG. 4 and the coil will be continuously connected to ground on the frame of the truck and the propulsion motor of the truck will stop.

A situation can be conceived wherein the dishonest attendant determined to make a "short" delivery and aware of the circuit employed by the invention, will attempt to drive the vehicle during the time between printings of the recorder while the take-off is engaged. Because the take-off switch is open, the engine will operate. This attempt at theft will, however, be evidenced by the destruction of the delivery pump which is not designed to withstand operation at the high speeds of rotation necessary in driving. Thus, to drive the truck without destroying the pump, it is first necessary to disengage the delivery pump take-off. The disengagement closes the pump take-off switch.

Sealing of the System

Figure 9:
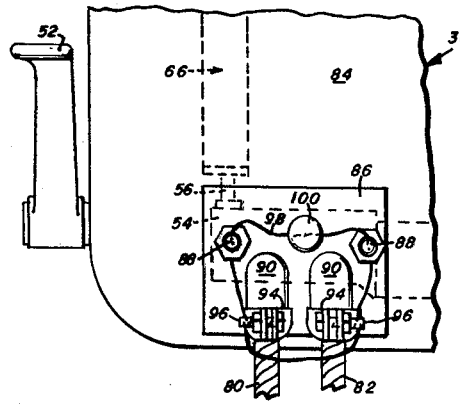
FIG. 9 is a fragmentary rear elevational view of a meter recorder embodying the invention.
Figure 10:
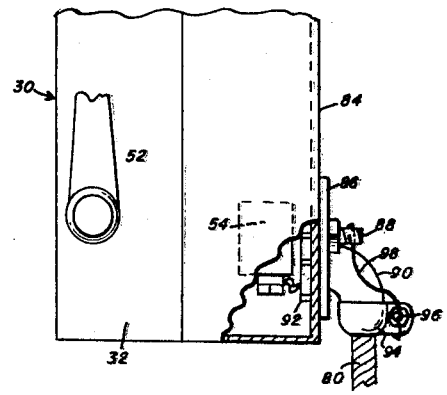
FIG. 10 is a fragmentary side elevational view of a meter recorder embodying the invention and having part of the rear housing broken away.

In order that the dishonest attendant be deterred from tampering with the circuit employed, the various parts may be sealed against intrusion. The present means is easily adapted to such protection. As shown in FIGURES 9 and 10 the electric leads 80–82 to the recorder switch are individually shielded and penetrate the recorder housing 84 in tamperproof fashion. In the preferred embodiment, the rear wall of the recorder housing 84 has adjacent the micro-switch 54 an opening which is provided with a cover plate 86 bolted in place on the rear of the housing. The bolts 88 have their shanks directed outward so that nuts are exposed from the outside of the housing. Each bolt has an aperture adjacent its nut and intermediate the nut and the end of its shank. The plate 86 is formed with a pair of spaced apertures each of which may receive an elbow fitting 90 having a reduced and threaded end, each end being secured in the plate 86 by a nut 92 within the housing. The nut threadedly engages the threaded end of the elbow and clamps it against the plate 86. Each of the elbow fittings is provided adjacent its distal end with an encompassing C-shaped clamp 94 having a bolt 96 and nut drawing its ends together. The bolts of the clamps have apertures in their shanks adjacent the nut and between the nut and the end of the shank opposite the head. A sealing wire 98 extends through all of the apertures in the bolt shanks, and the ends of the sealing wire are joined together by a lead seal 100. Alternatively, the nuts also may be apertured and the sealing wire extend through each bolt and nut as is well known in the art. Thus, it is impossible for one to tamper with the shielded cables 80, 82 leading to the recorder switch without breaking the seal 100. The recorder housing 84, of course, is sealed closed in the customary fashion.

Figure 11:
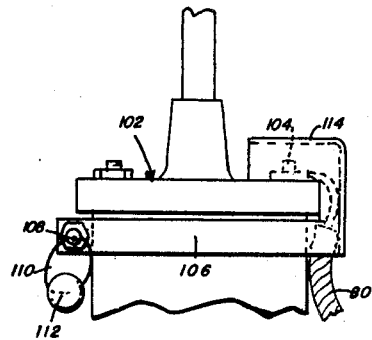
FIG. 11 is a fragmentary front elevational view of an ignition coil as used in an embodiment of the invention.
Figure 12:
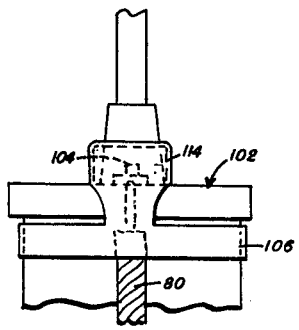
FIG. 12 is a fragmentary side elevational view of an ignition coil as used in an embodiment of the invention.

FIGURES 11 and 12 disclose the means by which the shielded cable is connected to the ignition system coil 102 in tamperproof fashion. The shield cable lead 80 extending from the recorder switch is connected to one of the coil terminals 104. A clamp 106 completely encompasses the side wall of the coil and extends in clamping fashion over the shielded cable. The clamp 106 is drawn tight by a bolt 108 and nut, the bolt having an aperture in its shank adjacent the nut and between the nut and the end of the shank. After the clamp is applied and the nut taken up, a sealing wire 110 is passed through the aperture. To the ends of the wire is affixed a lead seal 112. Extending upwardly from the encompassing clamp is a rigid hood member 114 which covers the terminal of the coil and prevents access thereto. It does not, however, interfere with the normal ignition system connections to the coil terminals (not shown). As shown in FIGURE 12, the hood terminates upwardly in an inverted box-shaped member, the walls of which are spaced from the terminal 104 to avoid short circuiting.

It is thus impossible for one to remove the shielded cable 80 from its connection to the coil terminal 104 without breaking the seal 112 and removing the coil-encompassing clamp 106.

Figure 13:
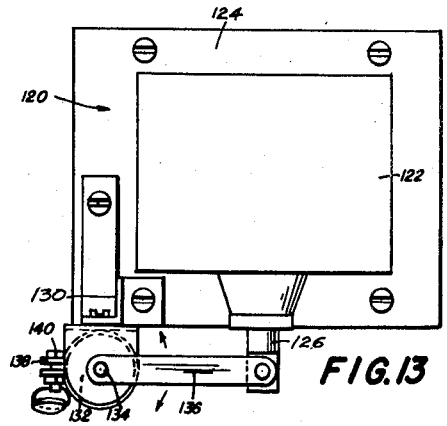
FIG. 13 is a top plan view of pump take-off drive means as used in an embodiment of the invention.
Figure 14:
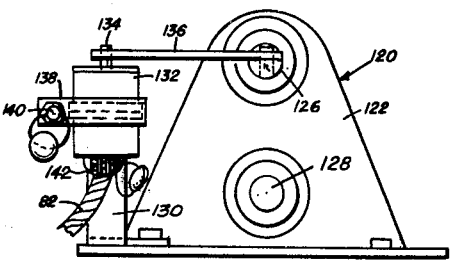
FIG. 14 is a side elevational view of a pump take-off as used in an embodiment of the invention.

The mounting of the pump take-off switch is disclosed in FIGS. 13 and 14 wherein the pump take-off housing is designated 120. It comprises a dome-shaped member 122 having extending therefrom a mounting flange 124 by which the unit is mounted on the vehicle transmission. The housing mounts an engagement actuator rod 126 operated by a conventional control linkage which is not shown. Axial movement of the actuator rod 126 engages or disengages the gears within the housing. The take-off drive shaft 128 extends out of the housing 120 below the actuator rod 126. On the flange 124 is mounted an upstanding leg 130. To the upper end of this leg is rigidly mounted a cup-shaped switch box 132 having a central upstanding switch stem 134 adapted in rotation to operate a switch within the box. The stem 134 has secured to it a lever 136 which extends out and is loosely connected to the take-off engagement actuator rod 126. One of the terminals of the switch within the cup-shaped box is grounded to the frame of the box 132 and hence to the metal frame of the vehicle. The other terminal is connected to the end of the shielded cable 82 from the recorder switch which extends through an opening in the cylindrical box 132. A C-shaped clamp 138 encompasses the box and holds its two flanged similar halves together. This clamp is drawn together by a bolt 140 and nut similar to the one on the clamp used in connection with the coil 102 above. As shown, the bolt is apertured adjacent the nut and a sealing wire passing through the opening in the bolt and a lead seal preclude tampering. Cable 82 extends in an opening in the bottom of the lower half of the box. The opening has an outwardly extending flange thereabout which receives another C-shaped clamp drawn up about cable 82 by bolt 142 having a nut and being apertured and sealed as bolt 140.

Thus as the linkage which operates the take-off actuator reciprocates, it oscillates the switch lever 136 to turn on and off the switch within the box 132. As indicated above, the switch is normally in the electrically closed disposition, but when the take-off gears are engaged, the switch is in the electrically open disposition.

Alternative Circuits Involving the Invention

Other embodiments of the circuit involving the invention are shown in FIGURES 15–18. FIGURE 15 shows schematically a circuit embodying the invention as it would be adapted to a gravity-dispensing system wherein no driven pump means are used. In such a system, simply, the recorder switch is connected between the ignition system and the metal frame of the vehicle or other ground so that the ignition is shorted and the engine may not operate between the inital and final printing of the recorder.

FIGURE 16 shows a modified form of a circuit embodying the invention wherein a pressure switch is employed. The pressure-sensitive actuator of this switch is connected to the outlet of the pump. This pressure switch is disposed in a parallel electrical circuit with the pump take-off switch. Employing such an arrangement, if an attempt is made to drive the vehicle away between the recordings and with the take-off switch in the open position, the pressure built up by the pump will close the pressure switch to short out the ignition system. In the preferred circuit embodying the invention, shown in FIGURES 2, 3 and 4, no such pressure switch is used. It has been found that the risk of destroying the pump by excess speed is enough to deter such an attempt, as explained above. However, in the alternative circuit embodying the invention as shown in FIGURE 16 this extra precaution is incorporated.

FIGURE 17 is a schematic diagram of a circuit by which the invention may be embodied in a diesel-powered vehicle. This diagram discloses the recorder switch and the pump take-off switch in series with a source of electric power P. A solenoid-operated valve V in the engine fuel line completes the circuit. Thus when both the recorder switch and the take-off switch are closed, the fuel line will be closed, cutting off the supply of fuel to the vehicle.

FIGURE 18 discloses a circuit embodying the invention in an electric-powered vehicle. In this embodiment, the recorder and the take-off switches are again in series with a power supply and a solenoid-operated means. The solenoid-operated means in this case is a normally closed power switch S, which, when both the recorder and the take-off switch are closed, is driven to electrically open disposition. The opening of the power switch opens the propulsion circuit of the electric-powered vehicle to cut off its motor.

While this invention has been shown in but only a few forms, it will be obvious to those skilled in the art that it is not so limited but that it is susceptible of various changes and modifications without departing from the scope of the claimed invention.

I claim:

A printing mechanism for a meter counter comprising a frame member, a sales slip-supporting tray member mounted vertically on the rear of said frame member for reciprocation thereagainst in order to hold a sales slip and to move such sales slip to a first and second printing position, said frame member having disposed under the tray member a rearwardly extending block providing a vertically disposed rear face, said tray member mounting on its rear face an L-shaped member defined by a first leg disposed in a vertical position and secured against the tray member and a second leg disposed horizontally under said first leg and perpendicular to said tray member, a switch bracket including a partial housing having a horizontal top wall, a vertical rear wall and a vertical side wall disposed perpendicular to said top and rear walls, said walls being mutually connected along adjacent edges, said side wall having secured thereto along a vertical line at a distance spaced from the connection of said side wall and said rear wall an arm directed perpendicularly out from said side wall and comprising a flat plate disposed in a vertical plane and secured against the rear face of said rearwardly extending block, a normally electrically open micro-switch disposed with its plunger actuator directed upwardly toward the second leg of said L-shaped member, said micro-switch being secured to the underside of the top wall of the partial housing of said switch bracket, whereby when said tray member is in a first position ready for printing the second leg of said L-shaped member holds said switch plunger actuator down so that said switch is in an electrically open disposition and when said tray member is in a second position ready for printing, the second leg of said L-shaped member is spaced above said switch permitting said plunger actuator to be disposed in its electrically closed disposition.

References Cited in the file of this patent

UNITED STATES PATENTS 2,204,922   Berck _____ June 18, 1940